US006398066B1

(12) United States Patent
Mullins (10) Patent No.: US 6,398,066 B1
(45) Date of Patent: Jun. 4, 2002

(54) GRIPPING HANDLE ASSEMBLY FOR FRYER BASKET

(75) Inventor: Daniel A. Mullins, Dayton, OH (US)

(73) Assignee: Henny Penny Corporation, Eaton, OH (US)

( * ) Notice: Subject to any disclaimer, the term of this patent is extended or adjusted under 35 U.S.C. 154(b) by 61 days.

(21) Appl. No.: 09/641,911

(22) Filed: Aug. 21, 2000

(51) Int. Cl.[7] .............................................. B65D 25/00
(52) U.S. Cl. ...................................... 220/759; 220/485
(58) Field of Search ................................ 220/759, 485, 220/737, 742, 752, 769

(56) References Cited

U.S. PATENT DOCUMENTS

| | | | | |
|---|---|---|---|---|
| 430,984 A | * | 6/1890 | Benvenisti | 220/759 |
| 1,277,182 A | * | 8/1918 | Borsse | 220/759 |
| 1,282,094 A | * | 10/1918 | Lindner | 220/485 |
| 1,419,860 A | * | 6/1922 | Kirby | 220/759 |
| 2,370,860 A | * | 3/1945 | Hanke | 220/759 X |
| 3,156,177 A | | 11/1964 | Sanders | 99/339 |
| 3,242,849 A | | 3/1966 | Wells | 99/411 |
| 3,272,547 A | * | 9/1966 | Pryce | 220/759 X |
| 3,273,488 A | | 9/1966 | Anetsberger | 99/107 |
| 3,484,252 A | | 12/1969 | Popeil | 99/100 |
| 3,685,433 A | | 8/1972 | Cunningham | 99/408 |
| 3,707,015 A | * | 12/1972 | Maynard | 220/759 |
| 3,958,503 A | | 5/1976 | Moore | 99/327 |
| 4,444,095 A | | 4/1984 | Anetsberger et al. | 99/408 |
| 4,508,026 A | | 4/1985 | Anetsberger et al. | 99/407 |
| 4,599,990 A | | 7/1986 | Fritzsche et al. | 126/351 |
| 4,602,612 A | | 7/1986 | Schwizer | 126/391 |
| 4,721,094 A | | 1/1988 | Nett | 126/369 |
| 4,785,725 A | | 11/1988 | Tate et al. | 99/330 |
| 4,997,101 A | | 3/1991 | King et al. | 220/318 |
| 5,253,566 A | | 10/1993 | McCabe et al. | 99/403 |

OTHER PUBLICATIONS

Copy of Copending U.S. application No. 60/182,214.

* cited by examiner

Primary Examiner—Steven Pollard
(74) Attorney, Agent, or Firm—Baker Botts L.L.P.

(57) ABSTRACT

A gripping handle assembly for securely lifting a container, includes a handle having a first portion and a second portion, which is formed at a predetermined angle to the first portion. The second portion includes a first and a second face and a slot formed therethrough. A grasping arm is pivotally attached to the second face of the second portion, and a release arm is pivotally attached to the first face of the second portion. A grasping arm control rod passes through the slot and operably couples the grasping arm to the release arm, and a spring pivots an end of the grasping lever away from the second face. The assembly further includes a scabbard, which receives the second portion of the handle and is secured to the container. The scabbard includes a recess, and the grasping arm engages the recess to secure the handle to the scabbard.

24 Claims, 9 Drawing Sheets

GRIPPING HANDLE ASSEMBLY FOR FRYER BASKET

BACKGROUND OF THE INVENTION

1. Field of the Invention

The invention relates to handle assemblies for securely gripping containers. In particular, the invention relates to handle assemblies adapted to securely grip fryer baskets in order to remove them from and replace them to fryer vats.

2. Description of Related Art

In commercial and some residential kitchens, fryers such as deep fat fryers, may be used to cook food products. For example, deep fat fryers, or gas fryers, are commercially used by restaurants, institutional kitchens, and fast food establishments for cooking a variety of food products, such as French fries, fish, fried chicken, and the like. Food products are cooked by immersing them within a fryer vat that is filled with a heated, liquid cooking medium, such as melted shortening, vegetable oil, or the like. The cooking medium may be heated using a flow of heated gas that is forced or drawn through flow passages that are in thermal communication with wall portions of the fryer vat or are disposed within the vat itself in order to increase the heat transfer to the cooking medium. Other fryers may employ electric coils to melt a solid cooking medium, heat the cooking medium to a desired cooking temperature, and maintain the cooking medium at the desired temperature during the cooking cycle.

Food products may be placed in a container, e.g., a basket, before being placed in the fryer vat and lowered into the heated, liquid cooking medium. While cooking, the food products may absorb some of the cooking medium, this may increase the weight of the container to be removed from the fryer vat. Moreover, it may be desirable to shake the container over the fryer vat after removing it from the cooking medium to remove residual cooking medium from the surfaces of the containers or from the surface of the food products, or both. In order to lower the container into the cooking medium and remove the container from the cooking medium after the food products are cooked, the container may be equipped with a handle.

If permanently affixed to the container, the temperature of the handle may increase as the food products cooks. Because the temperature of the cooking medium may exceed 250° F. (121° C.), the handle may become too hot to grasp without an oven mitt or other hand protection. Further, because the cooking medium may splash, splatter, or spray while the food products cook, the handle may become coated with a layer of the cooking medium and may become difficult to grasp.

Removable handles may avoid the heating problem experienced with some permanent handles. However, removable handles may be unable to securely grasp the container, especially after the container's surfaces have been coated by splashes, spray, and splatter from the cooking medium. This problem may be exacerbated by the added weight of the cooked food product or by the need to shake residual cooking medium from the surfaces of the container and from the surface of the food products, or both. For example, in a known removable handle assembly, the handle is equipped with an outwardly curled lip at one end. A scabbard for receiving the handle is secured to the container, and the scabbard is equipped with an internal projection for engaging the handle's curled lip. However, if the handle is shaken, the curled lip may disengage from the scabbard projection.

SUMMARY OF THE INVENTION

A need has arisen for a handle assembly, which may securely grip a container, such as a fryer basket. It is a feature of this handle assembly that a handle may engage and release the container. In particular, the handle may used to place the fryer basket into a fryer vat. The handle then may be disengaged from the fryer basket while food products are cooked within the basket. It is an advantage of this handle assembly that the handle of the assembly may remain cool while food products within the basket is cooked and the basket itself is heated in the fryer vat. It is a further advantage that because the handle of this handle assembly may be disengaged from the basket, the handle is not splattered with a hot cooking medium, e.g., shortening or vegetable oil, or the like, while the food products are cooked in the fryer vat.

In an embodiment, the invention is a gripping handle assembly for securely lifting a container. The assembly comprises a handle comprising a first portion and a second portion, formed at a predetermined angle to the first portion. The second portion comprises a first and a second face and a slot formed therethrough. A grasping arm is pivotally attached to the second face of the second portion, and a release arm is pivotally attached to the first face of the second portion. A grasping arm control rod passes through the slot and operably couples the grasping arm to the release arm, and urging means pivots an end of the grasping lever away from the second face. The assembly further comprises a scabbard, which receives the second portion of the handle and is secured to the container. The scabbard comprising a recess, wherein the grasping arm engages the recess to secure the handle to the scabbard.

In another embodiment, the invention is a gripping handle assembly for securely lifting a fryer basket. The assembly comprises a handle comprising a first portion including a grip and a second portion, formed at an oblique angle to the first portion. The second portion comprises a first and a second face, a grasping lip formed at a lower edge of the second portion and curling outward from the first face, a slot formed therethrough, a first pivot connection formed on the first face and positioned above the slot, and a second pivot connection formed on the second face and positioned below the slot. A grasping arm including a grasping hook, is pivotally attached to the second pivot connection, a release arm is pivotally attached to the first pivot connection. A grasping arm control rod passes through the slot and operably couples the grasping arm to the release arm. The control rod may be integrally formed with the grasping arm. Alternatively, the control rod may be integrally formed with the release arm. Urging means (e.g., a spring, a pair of opposing magnets, an elastic compound, and the like) pivots an end of the grasping arm away from the second face. The assembly further comprises a scabbard, which receives the second portion of the handle and is secured to the fryer basket. The scabbard comprises a projection for engaging the grasping lip and a recess, wherein the grasping arm engages the recess to secure the handle to the scabbard.

The first face of the second portion of the handle may be concave, and the second face of the second portion of the handle may be convex. Alternatively, the second portion of the handle may have a V-shaped cross-section.

Other objects, features, and advantages will be understood by persons skilled in the art from the following detailed description of preferred embodiments of the present invention, in view of the accompanying figures.

BRIEF DESCRIPTION OF THE DRAWINGS

Embodiments of the invention are described below with reference to the accompanying figures, which are provided by way of example only, and are not intended to limit the present invention.

FIG. 3b is a cross-sectional view of the handle of FIG. 3a along line A—A; and

FIG. 3c is a side view of the handle of FIG. 3a.

FIG. 4b is a perspective view of the grasping arm of FIG. 4a.

FIG. 5b is a perspective view of the release arm of FIG. 5a.

FIG. 8b is a side view of the scabbard of FIG. 8a,

FIG. 8c is an overhead view of the scabbard of FIG. 8a,

FIG. 8d is a front plan view of the scabbard of FIG. 8a, and

FIG. 8e is a rear plan view of the scabbard of FIG. 8a.

DETAILED DESCRIPTION OF PREFERRED EMBODIMENTS

Figure 1:
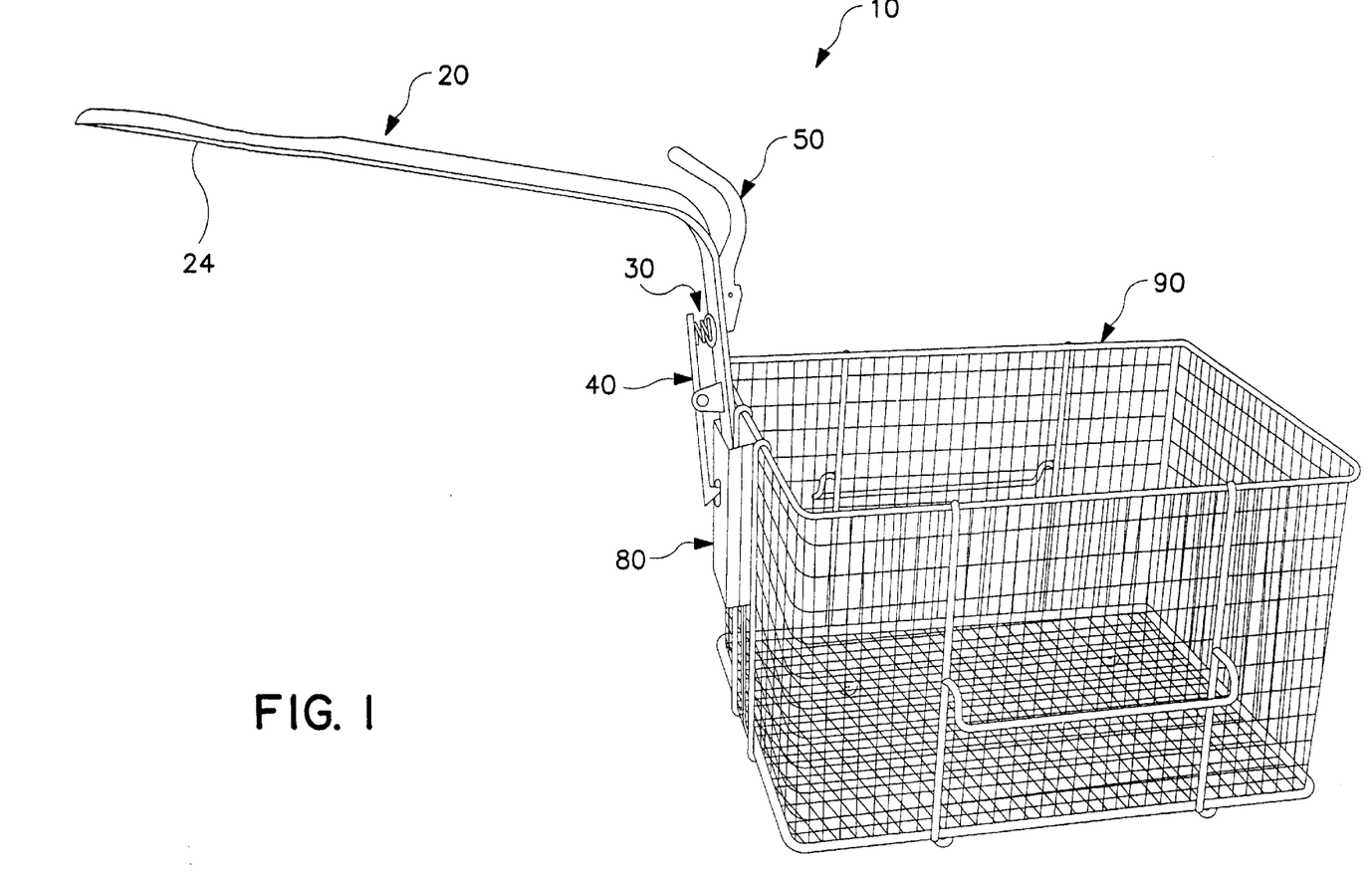
FIG. 1 is a perspective view of a gripping handle assembly, including a handle engaging a scabbard affixed to a fryer basket.

Referring to FIG. 1, a perspective view of a gripping handle assembly 10, including a handle 20 engaging a scabbard 80, which is affixed to a fryer basket 90, is depicted. Handle assembly 10 and basket 90 may be manufactured from metal or other materials, which are sufficiently rigid and strong to support the food products in a fryer vat and are resistant to the effects of heating and exposure to the cooking medium.

Handle 20 includes a grip 24, and a grasping arm 40 is pivotally mounted on one side of handle 20. A release arm 50 is pivotally mounted on the opposite side of handle 20. Grasping arm 40 and release arm 50 are joined by a grasping arm control rod (not shown), which passes through a slot (not shown) in handle 20. A first end of grasping arm 40 is pivoted away from handle 20 by a spring 30, and, consequently, the second end of grasping arm 40 is pivoted to engage scabbard 80. When release arm 50 is depressed toward handle 20, the control rod is drawn through the slot. As a result, spring 30 is compressed, the first end of grasping arm 40 is pivoted toward handle 20, and the second end of grasping arm 40 is pivoted away from scabbard 80.

Figure 2:
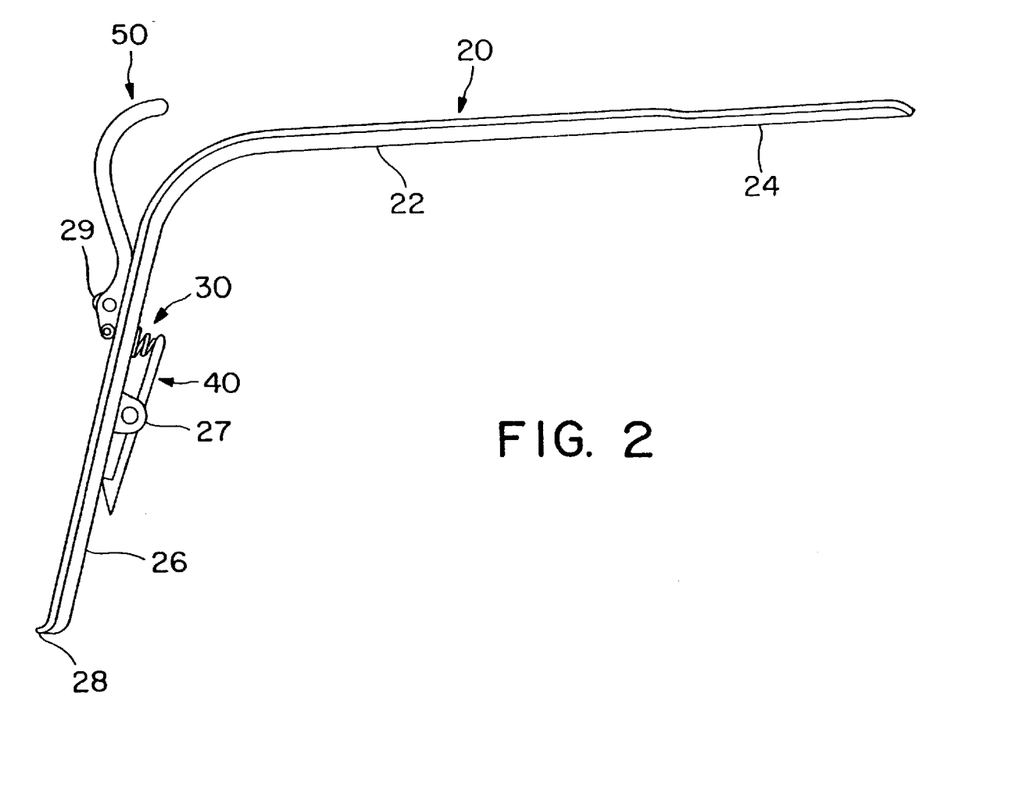
FIG. 2 is a side view of the handle including a grasping arm and a release arm, according to FIG. 1.

FIG. 2 is a side view of handle 20, including grasping arm 40 and release arm 50, according to FIG. 1. Handle 20 again includes grip 24 and comprises a first portion 22 and a second portion 26. Second portion 26 is formed at a predetermined angle, e.g., an oblique angle, to first portion 22, and handle 20 ends with an outwardly curled lip 28 at the end of second portion 26 opposite grip 24. Release arm 50 may be pivotally mounted to handle 20 by a first pivot connection 29, and grasping arm 40 may be mounted to handle 20 by a second pivot connection 27. The first end of grasping arm 40 is pivoted away from handle 20 by a spring 30, and, consequently, the second end of grasping arm 40 is pivoted against second portion 26 of handle 20.

Figure 3A:
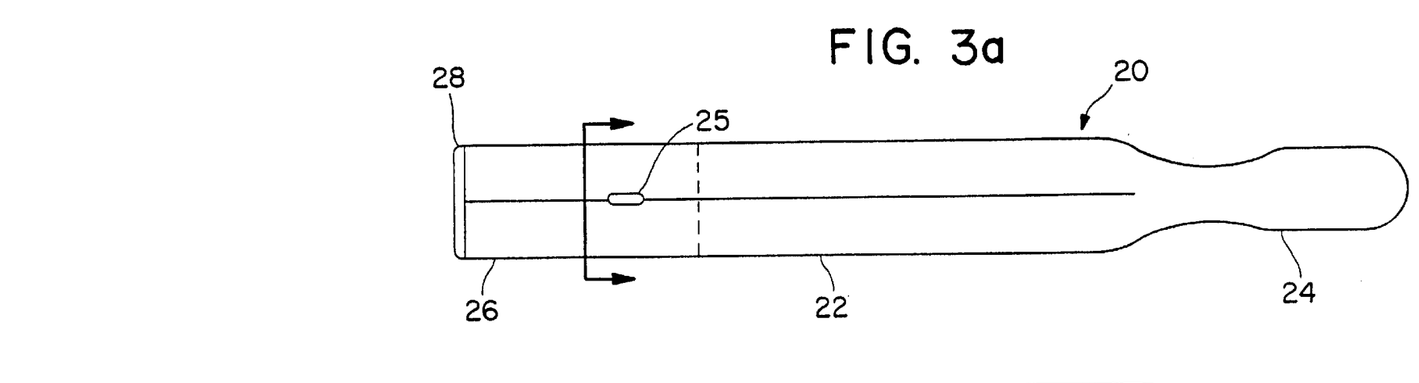
FIG. 3a is a plan view of the handle of FIG. 1 having first and second portions.
Figures 3B, 3C:
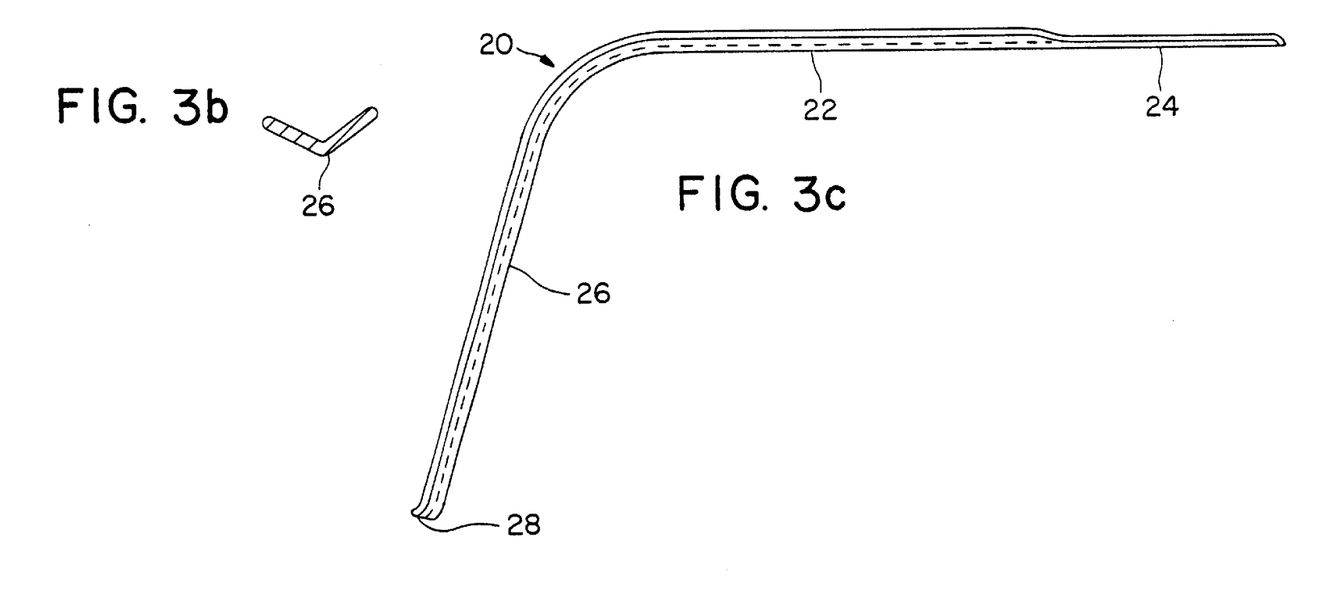

Handle 20 is described in greater detail with respect to FIGS. 3a–c. FIG. 3a is a plan view of handle 20 of FIG. 1 having first portion 22 and second portion 26, which are separated by a broken line. As described above, handle 20 further includes grip 24 and curled lip 28. Further, a slot 25, allowing the grasping arm control rod (not shown) to pass through handle 20, is formed in second portion 26 of handle 20. FIG. 3b is a cross-sectional view of handle 20 of FIG. 3a along line A—A. The cross-section is V-shaped defining a groove surface on a first face of handle 20. Although a V-shaped cross-section is shown, handle 20 may have a concave surface on its first face or a convex surface on a second face opposite the first face, or both. These cross-sectional shapes provide added strength to handle 20. FIG. 3c is a side view of handle 20 of FIG. 3a. The broken lines further demonstrate the V-shaped cross-section of handle 20.

Figure 4A:
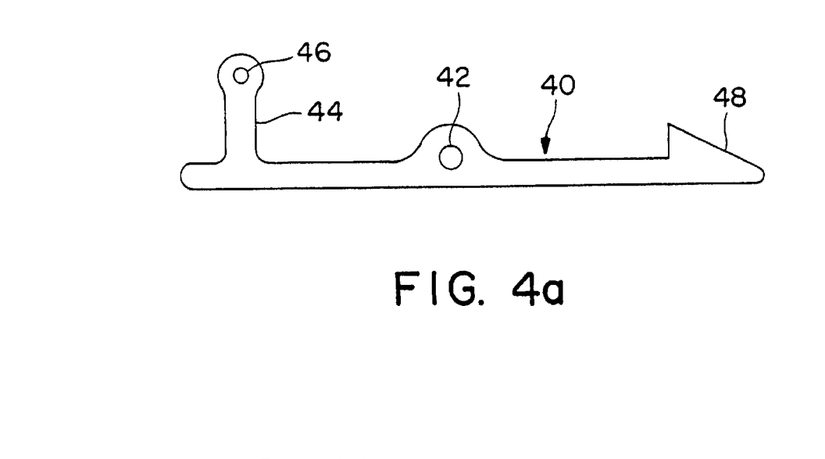
FIG. 4a is a side view of the grasping arm including an integral control rod.
Figure 4B:
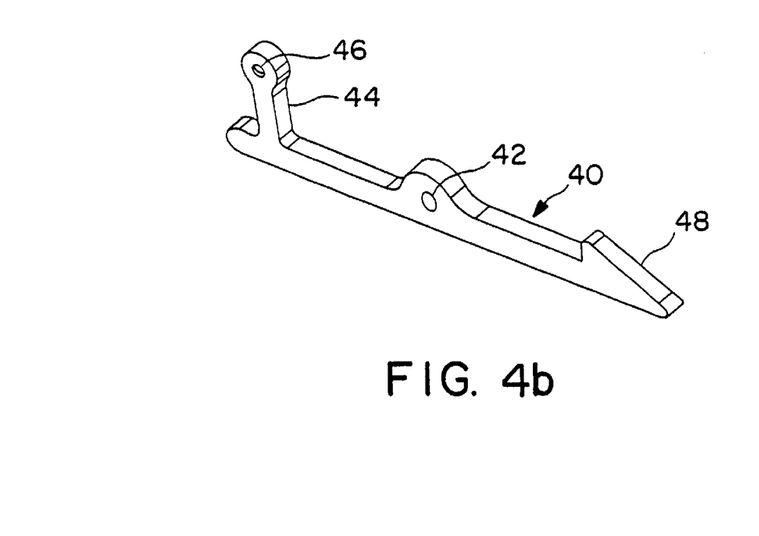

FIG. 4a is a side view of grasping arm 40. Grasping arm 40 is equipped with an orifice 42, formed therethrough and surrounded by a reinforcing band, by which grasping arm 40 may be pivotally secured to handle 20. Grasping arm 40 further comprises an integrally-formed, grasping arm control rod 44, which is formed at the first end of grasping arm 40. A grasping hook 48 is formed at the second end of grasping arm 40 and is adapted to engage a recess (not shown) formed in a scabbard 80 mounted basket 90, as shown in FIG. 1. FIG. 4b is a perspective view of grasping arm 40 of FIG. 4a.

Figure 5A:
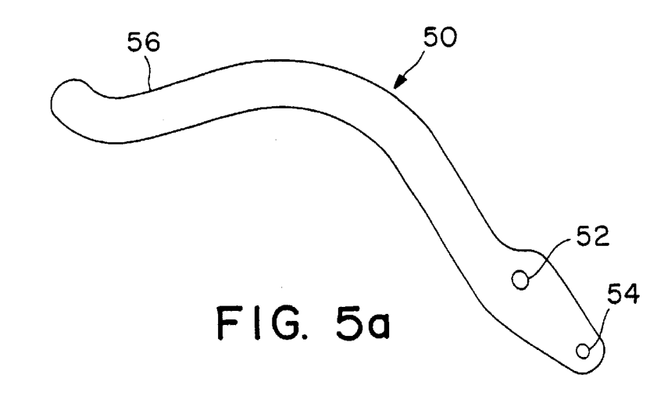
FIG. 5a is a side view of the release arm.
Figure 5B:
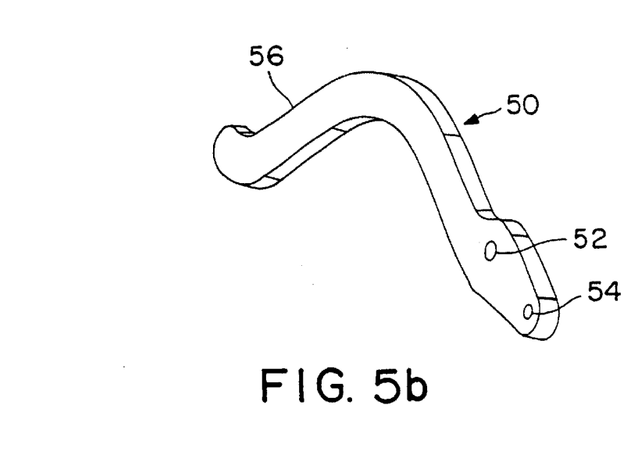

FIG. 5a is a side view of release arm 50. Similar to grasping arm 40, as described above, release arm 50 is equipped with an orifice 52, formed therethrough and surrounded by a reinforcing bulge, by which release arm 50 may be pivotally secured to handle 20. As noted above, grasping arm 40 comprises integrally-formed, grasping arm control rod 44. Control rod 44 is adapted to pass through slot 25 in handle 20 of FIG. 3a, and has an orifice 46 formed therethrough. When control rod 44 is inserted through slot 25 and grasping arm 40 and release arm 50 are pivotally mounted on handle 20, orifice 46 of control rod 44 may be aligned with an orifice 54 formed in release arm 50. Release arm 50 then may be secured to control rod 44 by passing a fastener (not shown), such as a rivet, a bolt, a screw, or the like, through orifices 46 and 54. A release arm grip 56 is formed opposite the pivotally secured portion of release arm 50, so that grasping arm 40 may be pivoted by depressing grip 56. FIG. 5b is a perspective view of release arm 50 of FIG. 5a.

Figure 6:
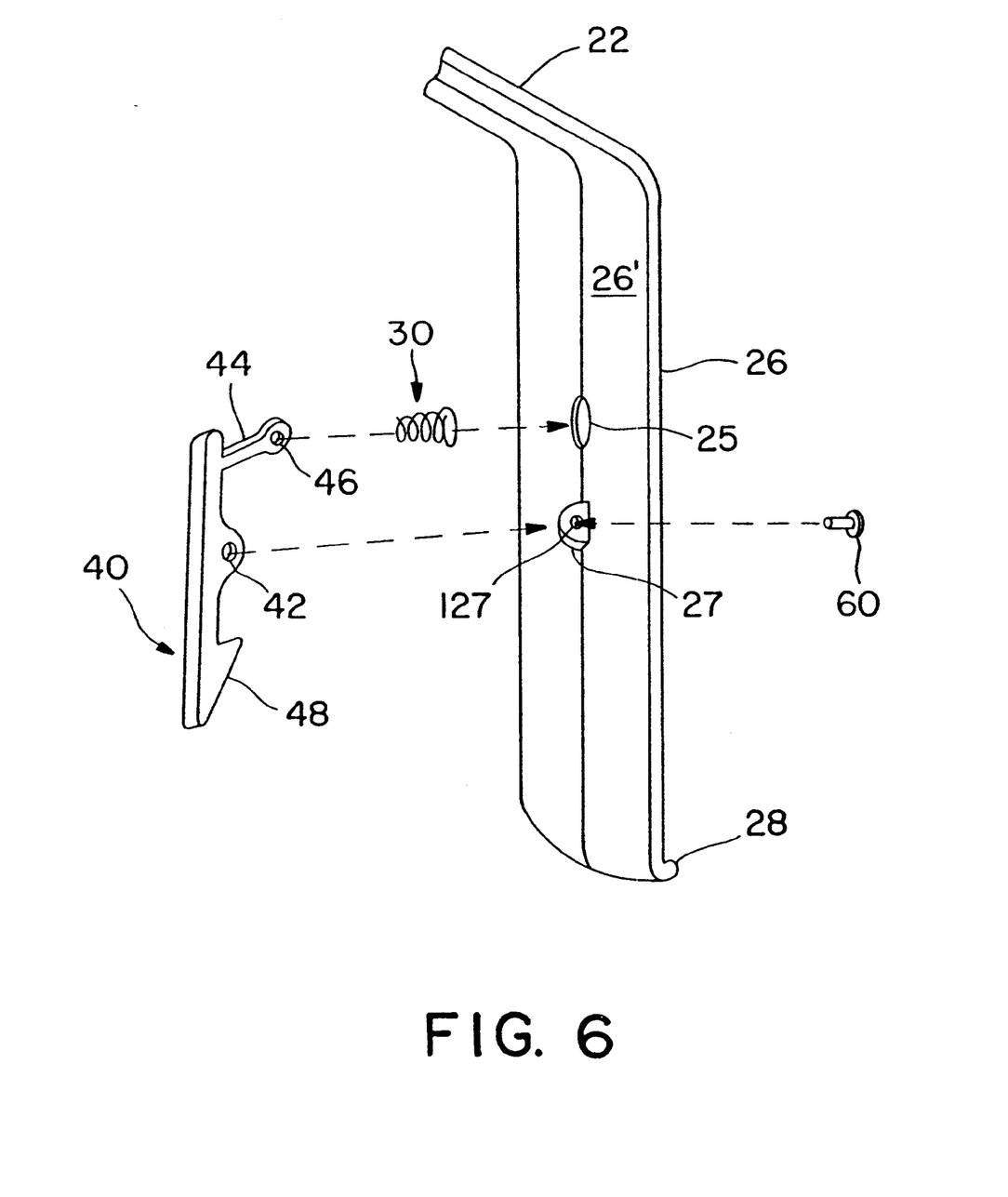
FIG. 6 is an exploded view of the handle of FIG. 1, showing the mounting of the grasping arm to the second face of the second portion of the handle.

In FIG. 6, an exploded view of handle 20, grasping arm 40, and spring 30 of FIG. 1 is shown. This figure depicts the mounting of grasping arm 40 to second pivot connection 27 on a second face 26' of second portion 26 of handle 20. Initially, control rod 44 may be threaded through spring 30. Control rod 44 then may be inserted through slot 25 of handle 20, and grasping arm 40 may be pivotally mounted on pivot connection 27 by inserting a grasping arm fastener 60, such as a rivet, a bolt, a screw, or the like, through an orifice 127 in pivot connection 27 and orifice 42 in grasping arm 40.

Figure 7:
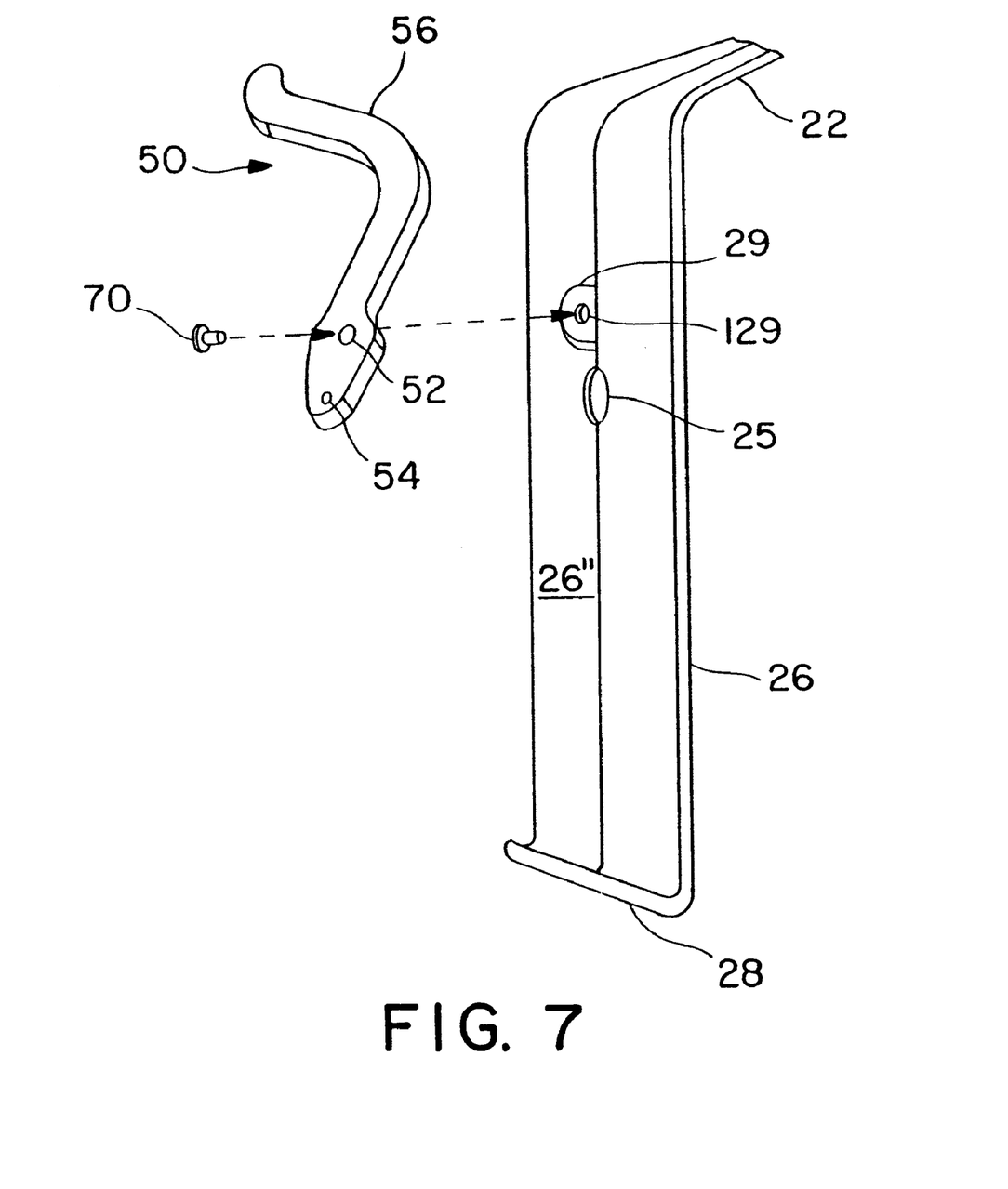
FIG. 7 is an exploded view of the handle of FIG. 1, showing the mounting of the release arm to the first face of the second portion of the handle.

Similarly, in FIG. 7, an exploded view of handle 20 and release arm 50 of FIG. 1 is shown. This figure depicts the mounting of release arm 50 to first pivot connection 29 on a first face 26" of second portion 26 of handle 20. Release arm 50 may be pivotally mounted on pivot connection 29 by inserting a release arm fastener 70, such as a rivet, a bolt, a screw, or the like, through an orifice 129 in pivot connection 29 and orifice 52 in release arm 50. Control rod 44 then may be secured to release arm 50, as described above.

Referring to FIGS. 2, 4a and 4b, and 7, control rod 44 is depicted as integrally formed with grasping arm 40. Nevertheless, the grasping arm control rod may be formed separately from either grasping arm 40 or release arm 50 or the control rod may be formed integrally with release arm 50, instead of grasping arm 40. If the control rod is formed separately from both grasping arm 40 and release arm 50, it is formed with an orifice or other connection means at either end, so that it may be secured to both grasping arm 40 and release arm 50. Moreover, if the control rod is formed integrally with release arm 50, orifice 54 is no longer necessary, and the control rod, having a separate orifice or other connection means at its end, extends from release arm 50 from about the location of orifice 54.

Figure 8A:
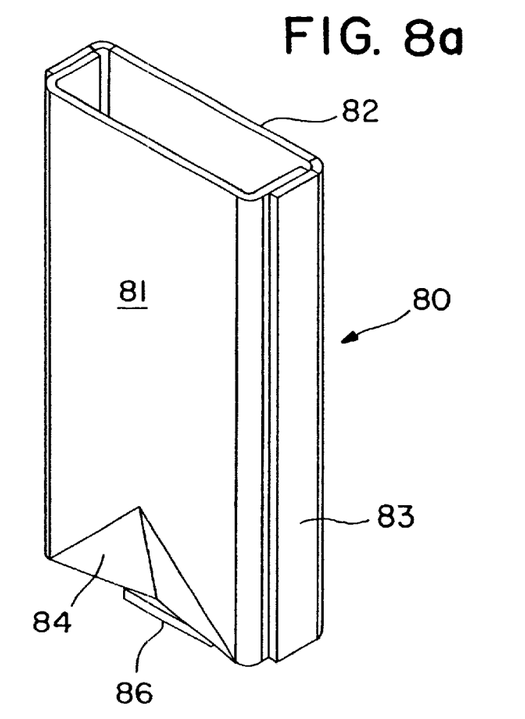
FIG. 8a is a rear perspective view of the scabbard of FIG. 1.

Scabbard 80 of FIG. 1 is depicted in detail in FIGS. 8a–e. FIG. 8a is a rear perspective view of scabbard 80. As shown in this figure, scabbard 80 may be rectangular in shape and may be formed from two essentially U-shaped components, which are joined to form a hollow rectangular space. Although scabbard 80 is depicted as rectangular, it may be formed in any shape suitable for receiving handle 20. Scabbard 80 may comprise a front wall 82, a rear wall 81, and a pair of side walls 83. A projection 84 may be formed in rear wall 81 and may extend into the interior of scabbard 80 adjacent to the bottom edge of rear wall 81. Projection 84 is depicted in FIG. 8a, as formed by a pair of triangular indentations, but projection 84 is not limited to that shape and may be formed in any shape providing an interior projection of the desired depth. Projection 84 may engage curled lip 28 of handle 20, as depicted in FIG. 3c. Moreover, a handle stop 86 may extend from front wall 82 toward projection 84 to prevent handle 20 from extending beyond scabbard 80.

Figure 8B:
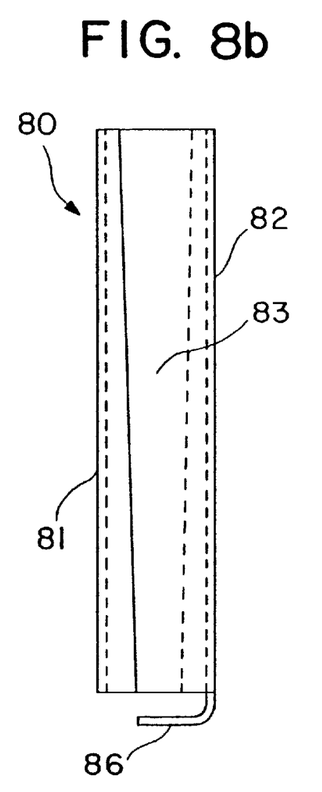
Figure 8C:
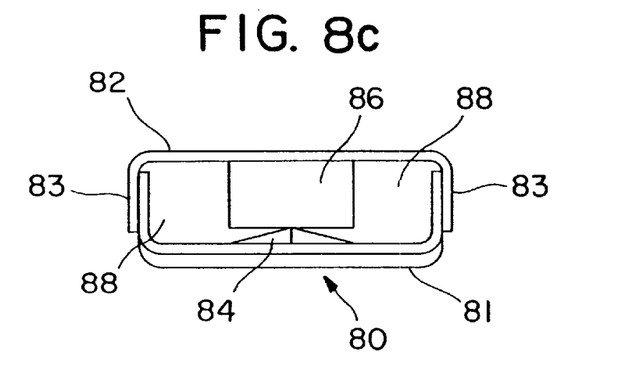

FIG. 8b is a side view of scabbard 80, and FIG. 8c is an overhead view of scabbard 80. In the side view of FIG. 8b, handle stop 86 is depicted as extending below the level of the scabbard's side walls. Moreover, the broken lines indicate the overlapping portions of the components, which are joined to form scabbard 80. Referring to FIG. 8c, the triangular shape of projection 84 is shown in the interior of scabbard 80. Despite this triangular shaped depiction, projection 84 may be formed in any shape, which may engage curled lip 28. Further, drain ports 88 are formed in the bottom of scabbard 80 to permit the cooking medium and food product residue to drain from scabbard 80. This reduces or eliminates the formation of obstructions within scabbard 80.

Figure 8D:
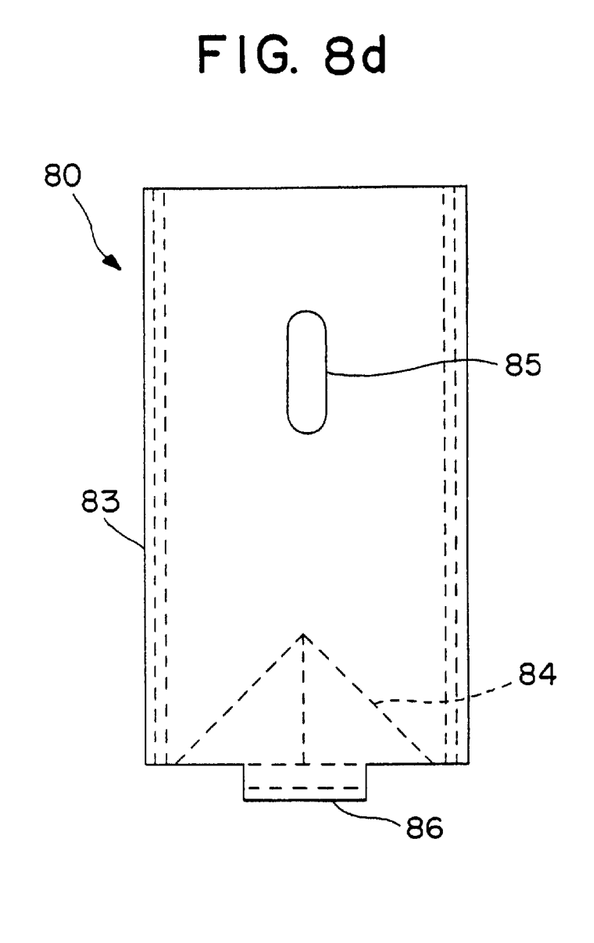
Figure 8E:
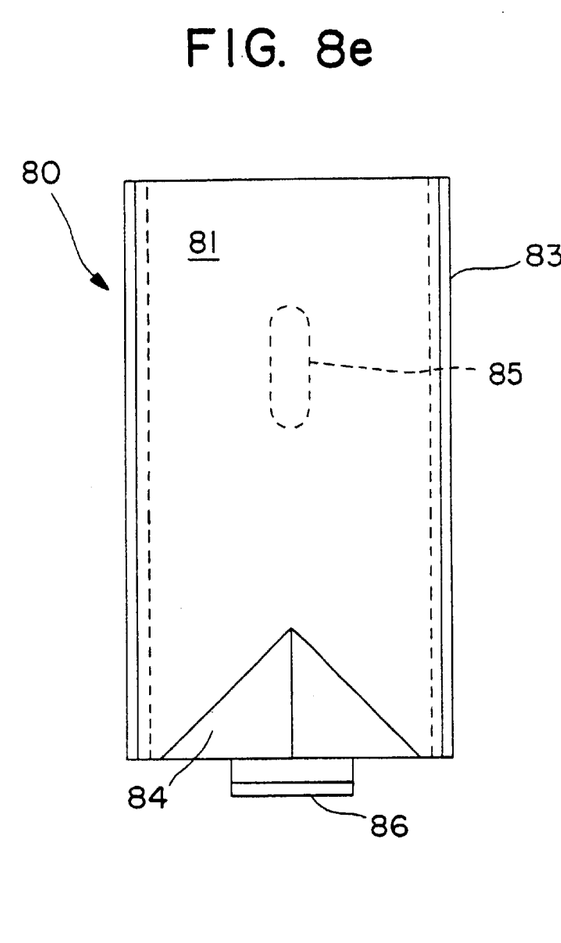

FIG. 8d is a front plan view of scabbard 80 of FIG. 8a, and FIG. 8e is a rear plan view of scabbard 80 of FIG. 8a. Each of these figures depicts the central axis positioning of a recess 85, which is adapted to engage grasping hook 48 of grasping arm 40. When grasping hook 48 engages recess 85 and curled lip 28 engages projection 84, handle 20 and scabbard 80 of handle assembly 10 are secured to each other. The shape and depth of recess 85 is determined by the shape and size of grasping hook 48. Alternatively, recess 85 may be formed as a hole passing through a front wall of the scabbard, e.g., front wall 82 of scabbard 80. In another embodiment, handle 20 including grasping arm 40 and release arm 50 may be used to lower or raise baskets with scabbards lacking recess 85. If the scabbard on such baskets is equipped with projection 84, handle 20 may engage projection 84 with curled lip 28, and grasping arm 40 will press against the scabbard's front wall.

Figure 9:
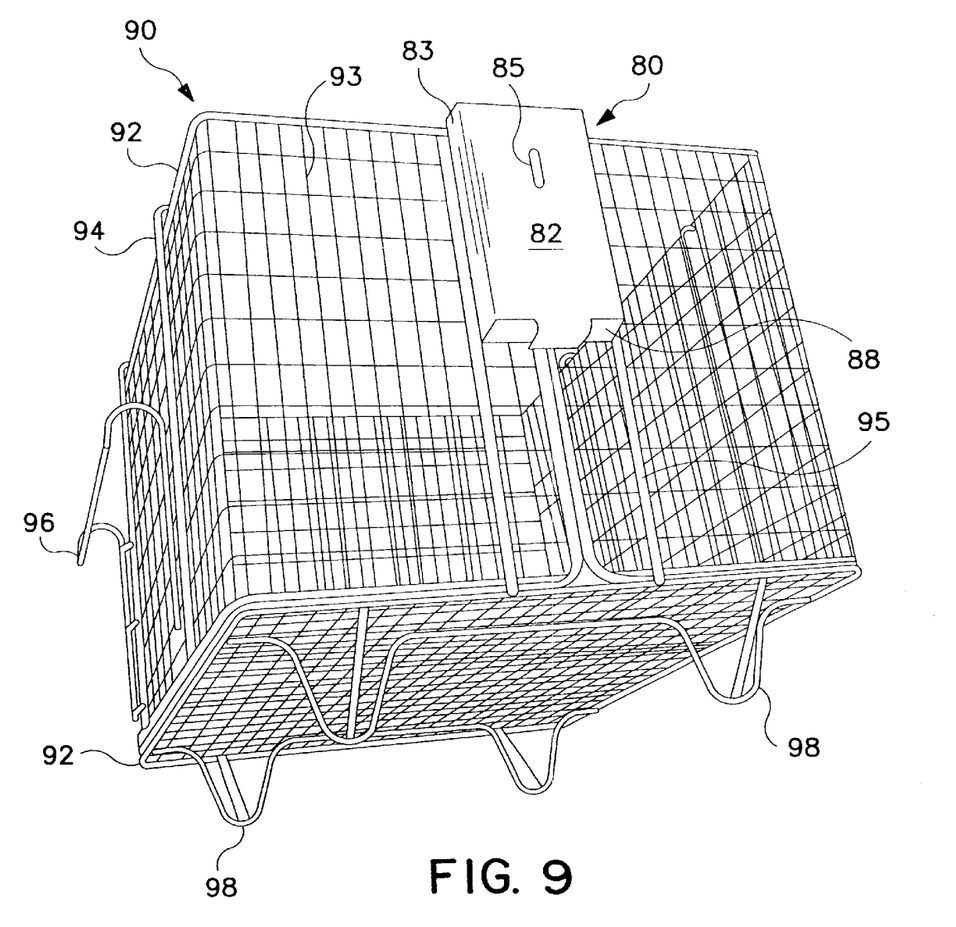
FIG. 9 is a perspective view of a fryer basket with a handle scabbard.

FIG. 9 is a perspective view of fryer basket 90, equipped with scabbard 80. Recess 85 and handle stop 86 of scabbard 80, which were described above with reference to FIGS. 8a–e, are depicted in FIG. 9. Basket 90 comprises a pair of horizontal reinforcing frames 92 and a plurality of vertical reinforcing rods 94. A plurality of basket walls 93 are secured to frames 92 and rods 94. Scabbard 80 is secured to frames 92 by a pair of scabbard supports 95. Further, basket 90 may comprise a plurality of basket supporting brackets 96 and a plurality of basket legs 98. Nevertheless, the size, shape and configuration of the container used with the handle assembly may be determined by the size and depth of the fryer vat; the size, weight, and amount of the food product to be cooked in the container; and combinations thereof.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A gripping handle assembly for securely lifting a container, comprising:
    a handle comprising a first portion and a second portion, formed at a predetermined angle to said first portion, said second portion comprises a first and a second face and a slot formed therethrough; a grasping arm pivotally attached to said second face; a release arm pivotally attached to said first face; a grasping arm control rod, which passes through said slot and operably couples said grasping arm to said release arm; and urging means for pivoting an end of said grasping lever away from said second face; and
    a scabbard, which receives said second portion of said handle to be secured to said container, said scabbard comprising a recess, wherein said grasping arm engages said recess to secure said handle to said scabbard.

2. The handle assembly of claim 1, wherein said container is a fryer basket.

3. The handle assembly of claim 1, wherein said first portion of said handle comprises a grip.

4. The handle assembly of claim 1, wherein said predetermined angle is an oblique angle.

5. The handle assembly of claim 1, said second portion of said handle further comprising a grasping lip formed at a lower edge of said second portion and curling outward from said first face.

6. The handle assembly of claim 5, said scabbard further comprising a projection for engaging said grasping lip.

7. The handle assembly of claim 1, said second portion of said handle further comprising a first pivot connection formed on said first face and positioned above said slot, and a second pivot connection formed on said second face and positioned below said slot.

8. The handle assembly of claim 1, wherein said grasping arm comprises a grasping hook.

9. The handle assembly of claim 1, wherein said control rod is integrally formed with said grasping arm.

10. The handle assembly of claim 1, wherein said control rod is integrally formed with said release arm.

11. The handle assembly of claim 1, wherein said urging means is selected from the group consisting of a spring, a pair of opposing magnets, and an elastic compound.

12. The handle assembly of claim 1, wherein said first face of said second portion of said handle is concave.

13. The handle assembly of claim 1, wherein said second face of said second portion of said handle is convex.

14. The handle assembly of claim 1, wherein said second portion of said handle has a V-shaped cross-section.

15. The handle assembly of claim 1, wherein said scabbard includes at least one drain port.

16. A gripping handle assembly for securely lifting a fryer basket, comprising:
- a handle comprising a first portion including a grip and a second portion, formed at an oblique angle to said first portion, said second portion comprises:
  - a first and a second face,
  - a grasping lip formed at a lower edge of said second portion and curling outward from said first face,
- a slot formed therethrough;
  - a first pivot connection formed on said first face and positioned above said slot, and
  - a second pivot connection formed on said second face and positioned below said slot;
- a grasping arm including a grasping hook, pivotally attached to said second pivot connection,
- a release arm pivotally attached to said first pivot connection;
- a grasping arm control rod, which passes through said slot and operably couples said grasping arm to said release arm;
- urging means for pivoting an end of said grasping arm away from said second face; and
- a scabbard, which receives said second portion of said handle to be secured to said fryer basket, said scabbard comprising a projection for engaging said grasping lip and a recess, wherein said grasping arm engages said recess to secure said handle to said scabbard.

17. The handle assembly of claim 16, wherein said control rod is integrally formed with said grasping arm.

18. The handle assembly of claim 16, wherein said control rod is integrally formed with said release arm.

19. The handle assembly of claim 18, wherein said urging means is selected from the group consisting of a spring, a pair of opposing magnets, and an elastic compound.

20. The handle assembly of claim 16, wherein said first face of said second portion of said handle is concave.

21. The handle assembly of claim 16, wherein said second face of said second portion of said handle is convex.

22. The handle assembly of claim 16, wherein said second portion of said handle has a V-shaped cross-section.

23. The handle assembly of claim 16, wherein said scabbard includes at least one drain port.

24. A container comprising a gripping assembly for securely lifting said container, wherein said gripping assembly comprises:
- a handle comprising a first portion and a second portion, formed at a predetermined angle to said first portion, said second portion comprises a first and a second face and a slot formed therethrough; a grasping arm pivotally attached to said second face; a release arm pivotally attached to said first face; a grasping arm control rod, which passes through said slot and operably couples said grasping arm to said release arm; and urging means for pivoting an end of said grasping lever away from said second face; and
- a scabbard, which receives said second portion of said handle to be secured to said container, said scabbard comprising a recess, wherein said grasping arm engages said recess to secure said handle to said scabbard.

* * * * *